United States Patent
Nakahama

(10) Patent No.: US 10,312,578 B2
(45) Date of Patent: Jun. 4, 2019

(54) RADAR DEVICE, RADAR TRANSMISSION METHOD, AND TRANSMISSION TIMING CONTROL METHOD

(71) Applicant: FURUNO ELECTRIC CO., LTD., Nishinomiya, Hyogo (JP)

(72) Inventor: Masahiro Nakahama, Nishinomiya (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 843 days.

(21) Appl. No.: 14/879,951

(22) Filed: Oct. 9, 2015

(65) Prior Publication Data
US 2016/0103205 A1    Apr. 14, 2016

(30) Foreign Application Priority Data

Oct. 14, 2014    (JP) .................................. 2014-209738

(51) Int. Cl.
| | | |
|---|---|---|
| H01Q 1/34 | (2006.01) | |
| G01S 13/22 | (2006.01) | |
| G01S 7/28 | (2006.01) | |
| H01Q 3/04 | (2006.01) | |
| G01S 13/42 | (2006.01) | |
| G01S 13/93 | (2006.01) | |
| G01S 7/04 | (2006.01) | |
| G01S 7/40 | (2006.01) | |

(52) U.S. Cl.
CPC .............. *H01Q 1/34* (2013.01); *G01S 7/2813* (2013.01); *G01S 13/225* (2013.01); *G01S 13/428* (2013.01); *G01S 13/9307* (2013.01); *H01Q 3/04* (2013.01); *G01S 7/043* (2013.01); *G01S 2007/403* (2013.01)

(58) Field of Classification Search
CPC ........ H01Q 1/34; H01Q 3/04; G01S 13/9307; G01S 13/428; G01S 7/2813; G01S 13/225; G01S 2007/403; G01S 7/043
See application file for complete search history.

(56) References Cited

U.S. PATENT DOCUMENTS

| | | | | |
|---|---|---|---|---|
| 5,311,188 A | * | 5/1994 | Meijer ................ | G01S 13/5248 342/160 |
| 8,344,938 B2 | * | 1/2013 | Leferink ................ | H01Q 1/521 342/159 |
| 2017/0016988 A1 | * | 1/2017 | Numata .................... | G01S 7/36 |

FOREIGN PATENT DOCUMENTS

| | | |
|---|---|---|
| JP | S60-041876 U | 3/1985 |
| JP | S61-070781 U | 5/1986 |
| JP | 62226076 A  * | 10/1987 |

(Continued)

*Primary Examiner* — Matthew M Barker
(74) *Attorney, Agent, or Firm* — Studebaker & Brackett PC

(57) ABSTRACT

There is provided a radar device with which the density of transmitted signals can be made uniform in relation to orientation even if the rotation rate of an antenna fluctuates, and interference removal processing can be given a simpler configuration. A radar device that transmits and receives signals while rotating an antenna comprises a motor, a transmission pulse generator, and a transmitter. The motor rotates the antenna (antenna main body). The transmission pulse generator generates transmission timing pulses for transmission signals from the antenna based on the rotational angle of the antenna main body. The transmitter transmits transmission signals via the antenna according to the transmission timing pulses generated by the transmission pulse generator.

10 Claims, 5 Drawing Sheets

(56) References Cited

FOREIGN PATENT DOCUMENTS

| JP | 63261183 A | * | 10/1988 |
| JP | S63-261183 A | | 10/1988 |
| JP | H05-297132 A | | 11/1993 |
| JP | 2606656 B2 | | 5/1997 |
| JP | 2012202806 A | * | 10/2012 |

* cited by examiner

RADAR DEVICE, RADAR TRANSMISSION METHOD, AND TRANSMISSION TIMING CONTROL METHOD

CROSS-REFERENCE TO RELATED APPLICATIONS

This application claims priority to Japanese Patent Application No. 2014-209738 filed on Oct. 14, 2014. The entire disclosure of Japanese Patent Application No. 2014-209738 is hereby incorporated herein by reference.

BACKGROUND

Field of the Invention

The present invention relates mainly to a radar device that repeatedly transmits signals at a specific timing.

Background Information

There are known radar devices that repeatedly transmit detection signals from a rotating antenna, acquire ambient information by analyzing the received echo signals, and generate and display a radar image (an echo image).

Japanese Patent No. 2,606,656 (Patent Literature 1) discloses a radar antenna transmission pattern measurement system used in this type of radar device. The radar antenna transmission pattern measurement system in Patent Literature 1 is configured to comprise a scanning angle (rotational angle) pulse generation means, a sampling trigger generation means, a reception means, a wireless transmission means, and a transmission pattern production means.

The above-mentioned sampling trigger generation means inputs a scanning angle pulse train and an excitation pulse train that is asynchronous with the scanning angle pulse train, designates an excitation pulse included in at least one of the preceding excitation pulse trains present within a given pulse interval of the scanning angle pulse train, and outputs this as a time reference sampling trigger in the transmission pattern acquisition that ensures synchronization with the scanning angle pulse train. With the configuration in Patent Literature 1, the azimuth angle of radar transmission waves can be found from the acquired transmission pattern, and angular resolution can be greatly enhanced.

SUMMARY

In general, the antenna of a radar device is rotationally driven at a constant speed by an electric motor. Therefore, the transmission timing of detection signals is set at a constant time interval on the premise that the antenna is rotating at a constant speed.

In actual practice, though, pulsation of torque in the electric motor that drives the antenna (known as cogging), and the effects of wind and the like inevitably result in a certain amount of fluctuation in the rotational speed of the antenna. Therefore, there will be some azimuths in which the density of transmission signals from the antenna is high, and some azimuths in which this density is low. As a result, the density of received signals varies with the azimuth, so the display of echoes ends up being coarse in some parts of the radar image, and improvement has been needed on this front.

In regard to this, the configuration in the above-mentioned Patent Literature 1 does disclose that the reception timing of the receiver is controlled based on the scanning angle of the radar antenna, but does not disclose that the transmission timing of the radar antenna is controlled according to this scanning angle.

The present invention was conceived in light of the above situation, and it is an object thereof to provide a radar device with which signals can be transmitted at a uniform density over all azimuths, even if the rotational speed of the antenna fluctuates.

The problem to be solved by the present invention is as given above, and the means for solving this problem, and the effects thereof, will now be described.

In a first aspect of the present invention, there is provided a radar device that transmits and receives signals while rotating an antenna, with the following configuration. Specifically, this radar device comprises a driver, a transmission timing signal generator, and a transmitter. The driver rotates the antenna. The transmission timing signal generator generates a transmission timing signal for transmission signals from the antenna, based on the rotational angle of the antenna. The transmitter transmits the transmission signals via the antenna according to the transmission timing signal generated by the transmission timing signal generator.

Consequently, the number of signals transmitted by the antenna within a certain angle can be kept constant regardless of any variance in the rotational speed of the antenna. Therefore, when an object is detected using this radar device, the density of received signals will be constant in relation to the azimuth, so the echo image can be generated uniformly, without any coarseness is some parts. Also, since transmission timing pulses are generated based on the rotational angle of the antenna, fluctuation attributable to the rotational speed of the antenna can result in temporal unevenness in the interval at which transmission timing signals are generated. Therefore, no mechanism has to be separately provided to offset the transmission timing in order to eliminate interference between radar devices, and interference removal processing can be performed with a simpler configuration.

With the above radar device, it is preferable if the transmission timing signal generator generates the transmission timing signal in synchronization with the timing at which the antenna rotates by a specific angle.

Consequently, signals can be transmitted at a uniform density with respect to the various detection azimuths, regardless of any fluctuation in the rotational speed of the antenna.

With the above radar device, it is preferable if the transmission timing signal generator generates a specific number of the transmission timing signals every time the antenna rotates by a specific angle.

Consequently, signals can be properly transmitted according to the actual rotation of the antenna.

The above radar device preferably has the following configuration. Specifically, this radar device further comprises a rotation controller for controlling the rotation of the antenna. The rotation controller varies the intervals of the transmission timing signals generated by the transmission timing signal generator by varying the rotational rate of the antenna.

Consequently, the transmission timing can be intentionally offset by control that varies the rotational speed of the antenna. Therefore, interference can be reliably eliminated between radar devices.

With the above radar device, it is preferable if the intervals of the transmission timing signals are varied by varying the angular interval of the antenna that generates the transmission timing signals.

Again with this configuration, interference can be reliably eliminated between radar devices.

The above radar device preferably has the following configuration. Specifically, this radar device further comprises a rotational angle output component for generating and outputting rotational pulses based on the rotational angle of the antenna. The transmission timing signal generator generates transmission timing pulses, which are the transmission timing signals, in synchronization with the rotational pulses outputted by the rotational angle output component.

Consequently, the time interval between signal transmissions can be reliably varied according to fluctuations in the rotational speed.

With the above radar device, it is preferable if the transmission timing signal generator can generate one or more of the transmission timing pulses for each rotational pulse outputted by the rotational angle output component.

Consequently, signals can be transmitted at the proper density from a rotating antenna.

With the above radar device, it is preferable if the transmission timing signal generator is configured to switch between a state in which the transmission timing signals are generated based on the rotational angle of the antenna, and a state in which the transmission timing signals are generated at specific time intervals.

Consequently, signals can be repeatedly transmitted from the antenna even in a state in which the rotation of the antenna has stopped, for example.

With the above radar device, it is preferable if the transmission timing signal generator generates the transmission timing signals such that at least one of the upper limit and the lower limit of the repeating frequency of the transmission timing signals is within a specific predetermined range.

Consequently, the repetition frequency of transmission timing signals can be kept within a suitable range, so the radar device will operate properly.

A second aspect of the present invention provides the following radar transmission method for transmitting signals while rotating an antenna. This radar transmission method includes a drive step, an antenna rotational angle output step, a transmission timing signal generation step, and a transmission step. In the drive step, the antenna is rotated. In the antenna rotational angle output step, the rotational angle of the antenna is outputted. In the transmission timing signal generation step, a transmission timing signal for the transmission signals transmitted by the antenna is generated based on the rotational angle of the antenna. In the transmission step, the transmission signals are transmitted via the antenna according to the transmission timing signal generated in the transmission timing signal generation step.

Consequently, the number of signals transmitted by the antenna within a certain angle can be kept constant regardless of any variance in the rotational speed of the antenna. Therefore, when an object is detected using this radar transmission method, the density of received signals will be constant in relation to the azimuth, so the echo image can be generated uniformly, without any coarseness is some parts. Also, since transmission timing signals are generated based on the rotational angle of the antenna, fluctuation attributable to the rotational speed of the antenna can result in temporal unevenness in the interval at which transmission timing signals are generated. Therefore, no mechanism has to be separately provided to offset the transmission timing in order to eliminate interference between radar devices, and interference removal processing can be performed with a simpler configuration.

A third aspect of the present invention provides the following transmission timing control method for controlling a transmission timing of signals repeatedly transmitted from a rotating antenna. Specifically, this transmission timing control method includes an antenna rotational angle acquisition step, a transmission timing signal generation step, and a signal transmission step. In the antenna rotational angle acquisition step, the rotational angle of the antenna is acquired. In the transmission timing signal generation step, a transmission timing signal is generated for transmission signals transmitted by the antenna, based on the rotational angle of the antenna. In the signal transmission step, signals are transmitted based on the transmission timing signal.

Consequently, since a transmission timing signal is generated based on the rotational angle of the antenna, fluctuations occurring in the rotational speed of the antenna can be utilized make the intervals between the generated transmission timing signals uneven over time, with a simple configuration.

BRIEF DESCRIPTION OF THE DRAWINGS

Referring now to the attached drawings which form a part of this original disclosure.

DETAILED DESCRIPTION OF EMBODIMENTS

Figure 1:
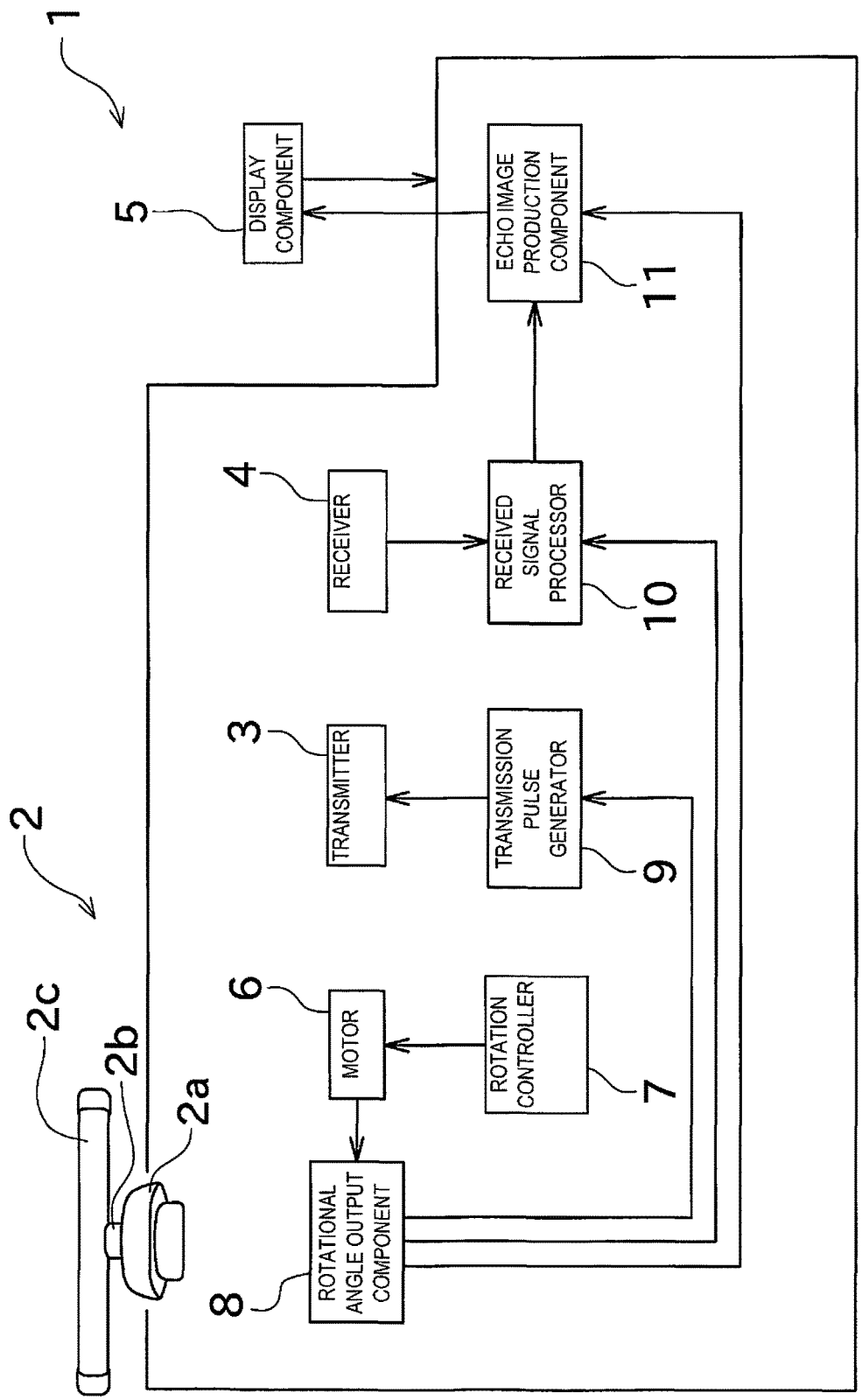
FIG. 1 is a block diagram of the configuration of the radar device pertaining to Embodiment 1 of the present invention.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. FIG. 1 is a block diagram of the configuration of the radar device 1 pertaining to this embodiment.

The radar device 1 in this embodiment is configured as a radar device that is installed on a ship. The user can check on the situation around the ship by looking at an echo image generated by the radar device 1.

As shown in FIG. 1, the radar device 1 mainly comprises an antenna 2 and a display component 5. This radar device 1 emits radio waves or other such signals via the antenna 2, receives the signals that are reflected back when the emitted radio waves hit an object, acquire information about the location, size, speed, and so forth of the object from the received signals, generates an echo image, and displays this on the display component 5.

The antenna 2 comprises a base case 2a, a cylindrical rotary shaft 2b that is supported by the base case 2a, and an antenna main body 2c that sends and receives signals while rotating around the axis of the rotary shaft 2b.

A motor 6 (driver), which is the rotary power source for the antenna main body 2c, is disposed in the interior of the base case 2a. A circuit board and the like (not shown) are also installed in the interior of the base case 2a, which constitutes a transmitter 3, a receiver 4, a rotation controller 7, a rotational angle output component 8, a transmission pulse generator 9 (transmission timing signal generator), a received signal processor 10, an echo image production component 11, and so forth.

A waveguide tube (not shown) through which signals pass is installed in the interior of the rotary shaft 2b. The antenna main body 2c emits transmission signals inputted from the transmitter 3, receives reflected waves produced when these transmission signals hit an object and are reflected, and outputs these to the receiver 4.

The transmitter 3 is configured by a magnetron, for example, generates transmission signals (such as microwaves) at a specific transmission timing, and outputs these to the antenna 2.

The receiver 4 subjects signals received by the antenna 2 to amplification, filtering, A/D conversion, and so forth. In the following description, data based on signals received by the receiver 4 from the time when the transmitter 3 transmits a transmission signal until the next transmission signal is received will sometimes be called "sweep data."

The motor 6 drives the rotation of the antenna 2 under control commands from the rotation controller 7. This motor 6 can be an ordinary DC motor or AC motor, or a stepping motor or the like can be used.

The rotational angle output component 8 senses and outputs the actual rotational angle of the antenna main body 2c. Herein, the rotational angle of the antenna main body 2c will sometimes be called simply the "rotational angle of the antenna." Specific examples of the configuration of the rotational angle output component 8 include a configuration in which a signal outputted from a Hall element (not shown) built into the motor 6 is used as an antenna rotation signal, and a configuration in which a disk having a plurality of holes is attached to the rotary shaft of the motor 6, and light from a photo-interrupter is allowed to pass through to generate an antenna rotation signal. The above-mentioned disk, etc., may be attached to the rotary shaft 2b or the antenna main body 2c, rather than to the rotary shaft of the motor 6.

Figure 3:
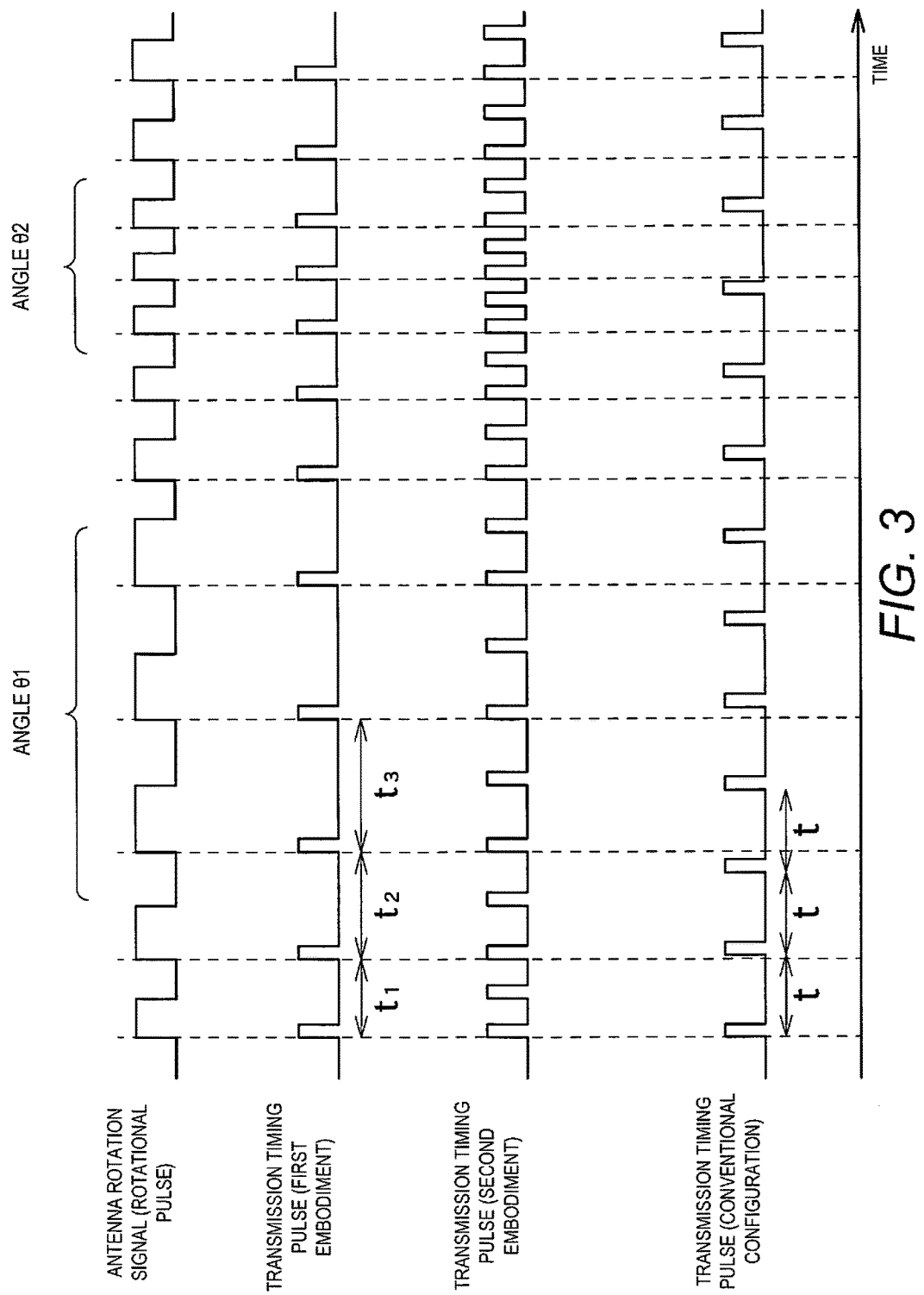
FIG. 3 is a graph comparing the transmission timing pulses of the radar devices in two embodiments of the present invention with the transmission timing pulses of a conventional radar device.

In this embodiment, the rotational angle output component 8 outputs the pulse signal (rotation pulse) indicated by "antenna rotation signal" in FIG. 3. This is not the only option, however, and it can also output other waveforms, such as a triangular wave, a sawtooth wave, or another such signal.

The transmission pulse generator 9 shown in FIG. 1 generates transmission timing pulses (transmission timing signals) in synchronization with the pulse signals of the rotational angle of the antenna main body 2c outputted by the rotational angle output component 8. The generated transmission timing pulses are outputted to the transmitter 3, and are used as a trigger for transmission signals in the transmitter 3.

The received signal processor 10 subjects the signals inputted from the receiver 4 to known gain adjustment processing, interference removal processing on the reception side (discussed below), or the like, and the processed signals are sent to the echo image production component 11.

The echo image production component 11 generates an echo image by performing known signal processing based on the signals that have undergone signal processing. More specifically, the echo image production component 11 acquires the distance to an object based on the time difference between the timing at which the antenna main body 2c transmitted a transmission signal and the timing at which the reflected signal was received. Also, the echo image production component 11 acquires the direction in which the object is located based on the orientation of the antenna 2 when the transmission signal was transmitted. The echo image production component 11 produces an echo image based on the above information, and outputs this to the display component 5.

The display component 5 is configured as a liquid crystal display, etc., and is electrically connected to the antenna 2. The display component 5 can display on its screen a radar image showing radar echoes from around the ship, produced by the echo image production component 11. The display component 5 also comprises an input key (not shown) or other such interface, and the user can operate this interface to issue various commands.

Next, the transmission timing of the transmission signals with the radar device 1 in this embodiment will be described in detail.

As discussed above, with a conventional radar device, the transmission timing is set so that radio waves will be transmitted at a constant time interval from the antenna, on the premise that the antenna (antenna main body) is rotating at a constant speed.

However, the actual rotational speed of the antenna may, for some reason, not be constant, and a certain amount of fluctuation may occur. For instance, the rotation of the antenna may be faster at some angles and slower at other angles due to the effect of natural wind or wind produced by the travel of the ship. Also, variance in motor speed due to differences in individual motors, and cogging torque of an electrical motor have been indicated as causes of fluctuation in the rotational speed of an antenna.

When the rotational speed of the antenna fluctuates as discussed above, the density of transmitted radio waves varies according to the orientation.

Figure 2:
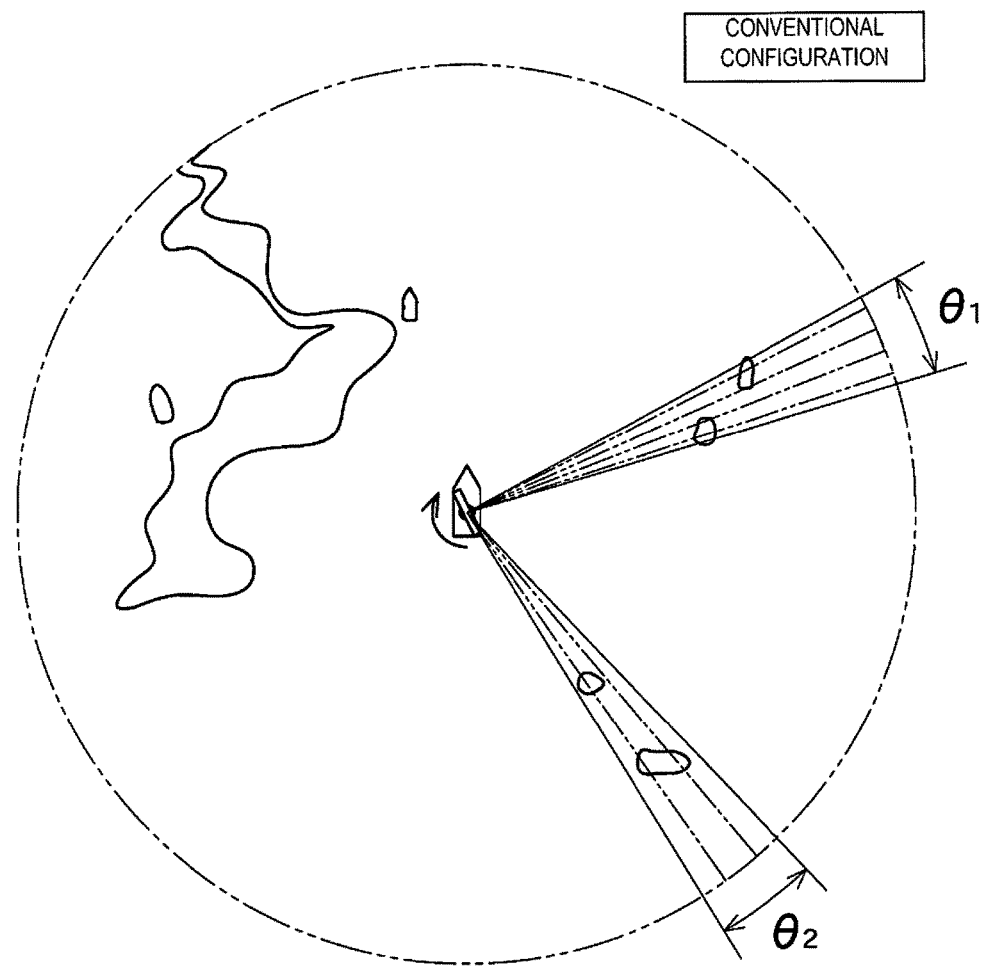
FIG. 2 is a diagram of a conventional radar device, in which the number of radio waves transmitted within a certain angle varies with the azimuth.

This will now be described through reference to FIGS. 2 and 3. The magnitudes of the two angles $\theta_1$ and $\theta_2$ shown in FIG. 2 are equal ($\theta_1=\theta_2$), and the rotational speed of the antenna main body 2c is lower than the rotational speed in the azimuth of the angle $\theta_1$, so the number of transmissions of radio waves is four, but the rotational speed is higher in the azimuth of the angle $\theta_2$, so the number of transmissions of radio waves is two. Thus, variance in the rotational speed of the antenna 2 can cause the number of radio waves transmitted by the antenna within an angle of a certain size (that is, the signal transmission density) to vary with the azimuth.

Also, with a conventional radar device, so-called interference removal processing is widely performed to remove the transmission signals of other radar devices that become mixed in with the received signals. This interference removal processing makes use of the fact that interference signals are relatively strong because they are received directly from another radar device, and involves a combination of processing on the transmission and reception sides as follows. First, on the transmission side, the transmission repetition frequency of the radio waves transmitted by the antenna are irregularly varied over a suitable range. Consequently, the transmission signals from the other radar device tend not to appear continuously in the antenna rotation direction at a specific distance. On the reception side, a plurality of sets of sweep data that are adjacent in the antenna rotation direction are compared at equal distances, and the signal with the lowest strength is outputted as processed data. This allows interference signals that are not continuous in the antenna rotation direction to be removed.

Since the transmission repetition frequency of signals from the antenna are thus varied, interference removal processing can also be considered to be a factor that causes the density of signals transmitted from a radar device to fluctuate with the azimuth.

As described above, with a conventional radar device, the spatial density of radio waves transmitted from an antenna fluctuates for a variety of reasons. Consequently, this also affects the echo image produced based on received signals. More specifically, if there are few signals transmitted for a given azimuth, there will also be fewer received signals (sweep data), so the echo image will be coarser. This partial decrease in the precision at which an echo image is drawn can make it harder for the user to accurately ascertain the actual situation of an object.

In this respect, with the radar device 1 in this embodiment, the transmission timing in the transmission of radio waves with the antenna 2 is set using the actual rotation of the antenna main body 2c as a reference. More specifically, as shown in FIG. 3, transmission timing pulses outputted by the transmission pulse generator 9 are generated according to the actual rotation (rotational pulses) of the antenna 2 sensed by the rotational angle output component 8. Therefore, even if there is fluctuation in the rotational speed of the antenna main body 2c, the density of signals transmitted from the antenna 2 can be made uniform for all azimuths. Referring to the example in FIG. 2, even if the rotational speed of the antenna main body 2c is different at the two angles $\theta_1$ and $\theta_2$, the transmission time interval between signals will vary according to the fluctuation in the rotational speed, so the same number of signals (such as three) can be transmitted. Since the density of transmitted signals can thus be made uniform in relation to azimuth, the echo image is prevented from being coarser is some parts.

Also, as described above, with the radar device 1 in this embodiment, the timing at which radio waves are transmitted from the antenna 2 is set so as to be synchronized with the rotational pulses outputted when the rotational angle output component 8 senses the rotation of the antenna main body 2c. Therefore, in regard to interference removal, if the above-mentioned variance occurs in the rotational speed of the antenna main body 2c, the time interval between transmission timing pulses generated by the transmission pulse generator 9 will naturally be different. FIG. 3 shows that the time intervals $t_1$, $t_2$, and $t_3$ of the transmission timing pulses in this embodiment are mutually different, whereas the time interval of the transmission timing pulses in a conventional configuration is constant at t.

Specifically, with this embodiment, since interference removal processing on the transmission side occurs naturally, without any special configuration, interference removal processing can be carried out favorably even with signals that are received directly. As a result, a configuration for interference removal processing is needed only on the reception side, and this effectively simplifies the configuration.

Figure 4:
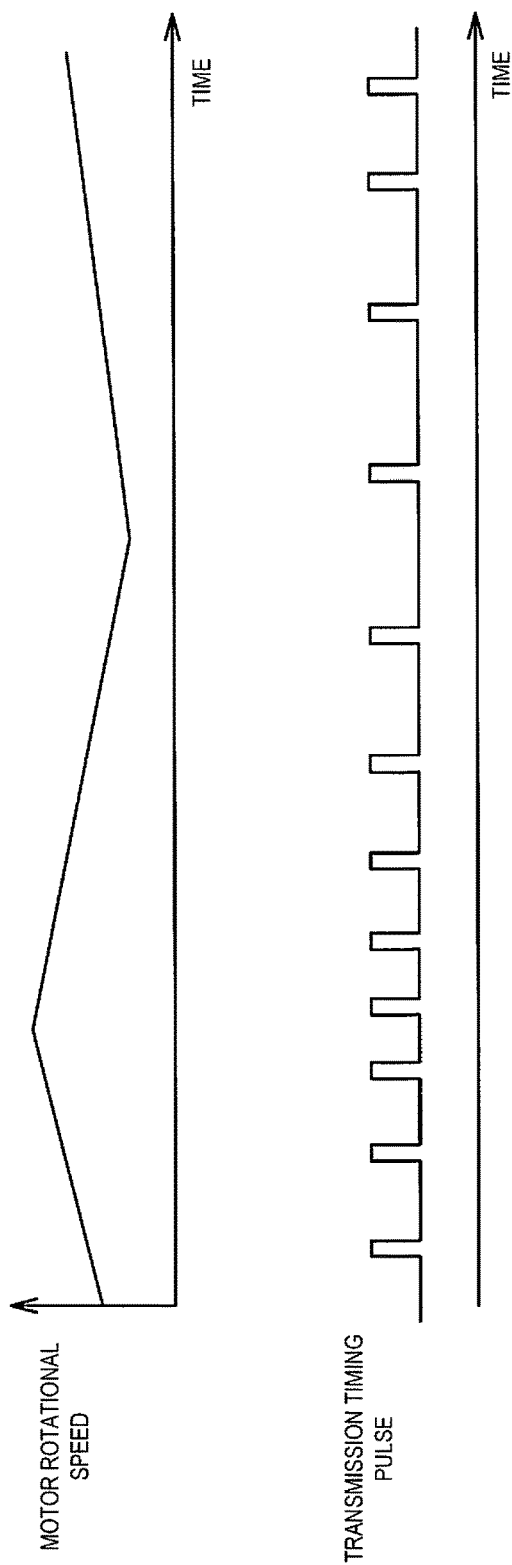
FIG. 4 shows the relation between motor rotational speed and transmission timing pulses in a modification example of Embodiment 1.

With the radar device 1 in this embodiment, the rotation controller 7 controls the motor 6 so that it rotates at a constant speed. However, in a modification example, the rotation controller 7 can be configured so that the rotational speed of the antenna main body 2c is actively varied in order for the above-mentioned interference removal to be performed more reliably. FIG. 4 shows an example in which the time interval of the transmission timing pulses is intentionally varied by causing the rotational speed of the motor 6 to fluctuate irregularly in the modification example.

The same effect as above can also be obtained by causing the angle interval at which the transmission timing pulses are transmitted to vary irregularly, instead of varying the rotational speed of the motor 6.

Also, there may be situations when the user wants to repeatedly transmit a signal in a state in which the rotation of the antenna main body 2c has stopped, in order to inspect the radar device 1, etc. With this in mind, the transmission pulse generator 9 of the radar device 1 in this embodiment is configured so that the user, etc., can suitably operate the display component 5 to switch between a state in which transmission timing pulses are generated based on the rotational pulses of the rotational angle output component 8 as above, and a state in which transmission timing pulses are generated at a specific time interval. This accommodates the above-mentioned need for inspection.

The transmission pulse generator 9 can also be configured so that the repetition frequency of the generated transmission timing pulses falls within a specific frequency range with established upper and lower limits (or, just one of the upper and lower limits may be established). This allows the radar device 1 to be operated properly as follows.

For example, immediately after the power to the radar device 1 is switched on the halted antenna main body 2c begins to rotate, the rotation is still slow, so the repetition frequency of the transmission timing pulses is correspondingly low. In view of this, in a case such as the above, the transmission pulse generator 9 generates transmission timing pulses at the lower limit frequency. With this configuration, even if signals need to be sent a few times for the sake of various initialization settings at the startup of the radar device 1, this initialization can be completed in a short time.

Meanwhile, even if the antenna main body 2c is blown by a strong wind and rotated at high speed, the frequency of the transmission timing pulses is not allowed to go over the upper limit by the transmission pulse generator 9. Consequently, the time interval at which the signals are transmitted from the antenna 2 is kept from being too short, so the proper amount of time is ensured for receiving echo signals.

As described above, the radar device 1 in this embodiment sends and receives signals while rotating the antenna 2. Also, the radar device 1 comprises the motor 6, the transmission pulse generator 9, and the transmitter 3. The motor 6 rotates the antenna 2 (the antenna main body 2c). The transmission pulse generator 9 generates transmission timing pulses of transmission signals of the antenna 2 based on the rotational angle of the antenna main body 2c. The transmitter 3 transmits signals via the antenna 2 according to the transmission timing pulses generated by the transmission pulse generator 9.

Consequently, despite the variance in the rotational speed of the antenna main body 2c, the number of signals transmitted by the antenna 2 within a certain angle can be kept constant. Therefore, when this radar device 1 is used to detect an object, since the density of the received signals is constant in relation to azimuth, a sharp echo image can be generated that is uniform and is not coarse in some places. Also, since the transmission timing pulses are generated based on the rotational angle of the antenna main body 2c, fluctuations that occur in the rotational speed of the antenna 2 will cause the intervals between the generated transmission timing pulses to be uneven over time. Therefore, no mechanism has to be separately provided to offset the transmission timing in order to eliminate interference between radar devices, and interference removal processing can be performed with a simpler configuration.

Next, a second embodiment will be described. With the radar device 1 in the first embodiment, a single transmission timing pulse was generated by the transmission pulse generator 9 for each rotational pulse outputted by the rotational angle output component 8 (see the portion for the first embodiment in FIG. 3). In this second embodiment, on the other hand, two transmission timing pulses can be generated for a single rotational pulse.

Figure 5:
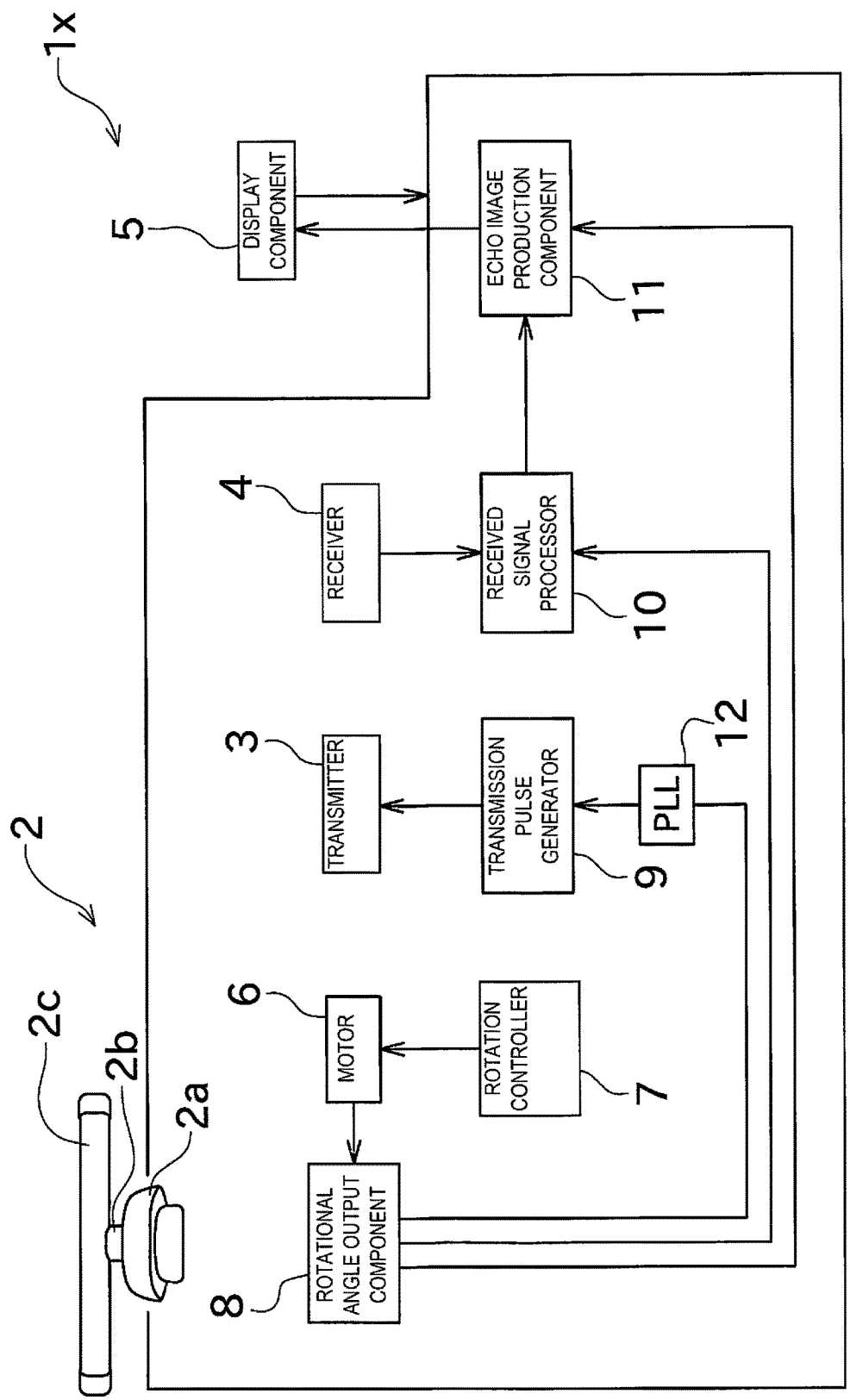
FIG. 5 is a block diagram of the configuration of the radar device in Embodiment 2.

FIG. 5 shows the radar device 1x in the second embodiment. With this radar device 1x, a PLL circuit 12 is provided between the rotational angle output component 8 and the transmission pulse generator 9. This allows two transmission timing pulses to be easily generated for a single rotational pulse outputted from the rotational angle output component 8 (see the portion for the second embodiment in FIG. 3).

In this embodiment, twice as many pulses are outputted with the PLL circuit 12, but this is not the only option. For example, the angular resolution of the rotational angle output component 8, the time interval between transmission signals that is to be ensured, and so forth can be taken into account to multiply the frequency to triple or higher so as to achieve the desired pulses.

Preferred embodiments of the present invention were described above, but the above configuration can be modified as follows, for example.

The above-mentioned interference removal processing on the reception side may be performed by the echo image production component 11 rather than the received signal processor 10.

The configuration may be such that the rotational pulses of the rotational angle output component 8 are inputted to the rotation controller 7, and so-called feedback control is performed.

In the first embodiment above, an example was given in which transmission timing pulses were generated so that the repetition frequency would be the lower limit when the antenna was rotating slowly immediately after startup. However, instead of this, the transmission timing pulses can be generated at a certain time interval for a specific length of time immediately after startup, and the transmission timing pulses can be generated based on the antenna angle once the specific length of time has elapsed. Also possible is a configuration in which transmission timing pulses are generated at a certain time interval until the rotational speed of the antenna reaches a specific speed.

The radar device of the present invention is not limited to an open type in which the rotating antenna main body 2c is exposed as in FIG. 1, and can also be applied to a radome type in which the rotating antenna main body is covered.

The radar device of the present invention can be installed not only in a ship, but also in any other moving body. It can also be installed on land.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A radar device for transmitting and receiving signals while rotating an antenna, the radar device comprising:
   a driver configured to rotate the antenna;
   a transmission timing signal generator configured to generate a transmission timing signal for transmission signals from the antenna, based on the rotational angle of the antenna; and
   a transmitter configured to transmit the transmission signals via the antenna according to the transmission timing signal generated by the transmission timing signal generator;
   the transmission timing signal generator being further configured to switch between a state in which the transmission timing signals are generated based on the rotational angle of the antenna, and a state in which the transmission timing signals are generated at specific time intervals.

2. The radar device according to claim 1, wherein
   the transmission timing signal generator is configured to generate the transmission timing signal in synchronization with the timing at which the antenna rotates by a specific angle.

3. The radar device according to claim 1, wherein
   the transmission timing signal generator is configured to generate a specific number of the transmission timing signals every time the antenna rotates by a specific angle.

4. The radar device according to claim 1, further comprising
   a rotation controller configured to control the rotation of the antenna,
   wherein the rotation controller is configured to vary time intervals of the transmission timing signals based on the rotational angle of the antenna by varying the rotational rate of the antenna.

5. The radar device according to claim 1, wherein
   time intervals of the transmission timing signals based on the rotational angle of the antenna are varied by selecting different angular intervals about the rotation of the antenna at which the timing signals are transmitted.

6. The radar device according to claim 1, further comprising
   a rotational angle output component configured to generate and output rotational pulses based on the rotational angle of the antenna,
   wherein the transmission timing signal generator is configured to generate transmission timing pulses, which are the transmission timing signals, in synchronization with the rotational pulses outputted by the rotational angle output component.

7. The radar device according to claim 6, wherein
   the transmission timing signal generator is configured to generate one or more of the transmission timing pulses for each rotational pulse outputted by the rotational angle output component.

8. The radar device according to claim 1, wherein
   the transmission timing signal generator is configured to generate the transmission timing signals such that at least one of an upper limit and a lower limit of a frequency at which the transmission timing signals are generated is within a specific predetermined range.

9. A radar transmission method for transmitting signals while rotating an antenna, the method comprising:
    rotating the antenna;
    outputting a rotational angle of the antenna;
    generating a transmission timing signal for transmission signals transmitted by the antenna, based on the rotational angle of the antenna;
    transmitting the transmission signals via the antenna according to the transmission timing signal; and
    switching between a state in which the transmission timing signals are generated based on the rotational angle of the antenna, and a state in which the transmission timing signals are generated at specific time intervals.

10. A transmission timing control method for controlling a transmission timing of signals repeatedly transmitted from a rotating antenna, the method comprising:
    acquiring a rotational angle of the antenna;
    generating a transmission timing signal for transmission signals transmitted by the antenna, based on the rotational angle of the antenna;
    transmitting signals based on the transmission timing signal; and
    switching between a state in which the transmission timing signals are generated based on the rotational angle of the antenna, and a state in which the transmission timing signals are generated at specific time intervals.

* * * * *